(12) United States Patent
Suhr

(10) Patent No.: US 8,308,332 B1
(45) Date of Patent: Nov. 13, 2012

(54) SYSTEM AND METHOD FOR ILLUMINATING A SPORTS FIELD

(76) Inventor: Lyle Suhr, Valley Center, KS (US)

( * ) Notice: Subject to any disclaimer, the term of this patent is extended or adjusted under 35 U.S.C. 154(b) by 0 days.

(21) Appl. No.: 13/371,034

(22) Filed: Feb. 10, 2012

(51) Int. Cl.
*F21V 7/04* (2006.01)
(52) U.S. Cl. ......... 362/563; 362/554; 362/555; 362/805
(58) Field of Classification Search ....... 362/153–153.1, 362/249.01–249.05, 311.02, 551, 554–555, 362/563, 800, 805
See application file for complete search history.

(56) References Cited

U.S. PATENT DOCUMENTS

| 7,245,815 | B2 * | 7/2007 | Nicholls et al. | 385/147 |
| 2009/0197710 | A1 * | 8/2009 | Ronda | 473/490 |

* cited by examiner

*Primary Examiner* — Jason Moon Han
(74) *Attorney, Agent, or Firm* — Hovey Williams LLP

(57) ABSTRACT

A system for illuminating a sports field covered with turf. The system includes: a plurality of light arrays configured to be positioned in a spaced-apart manner under a portion of the turf and oriented to emit light upwards through the turf; and a control system for selectively controlling activation of the light arrays to provide illuminated markers on the sports field.

8 Claims, 7 Drawing Sheets

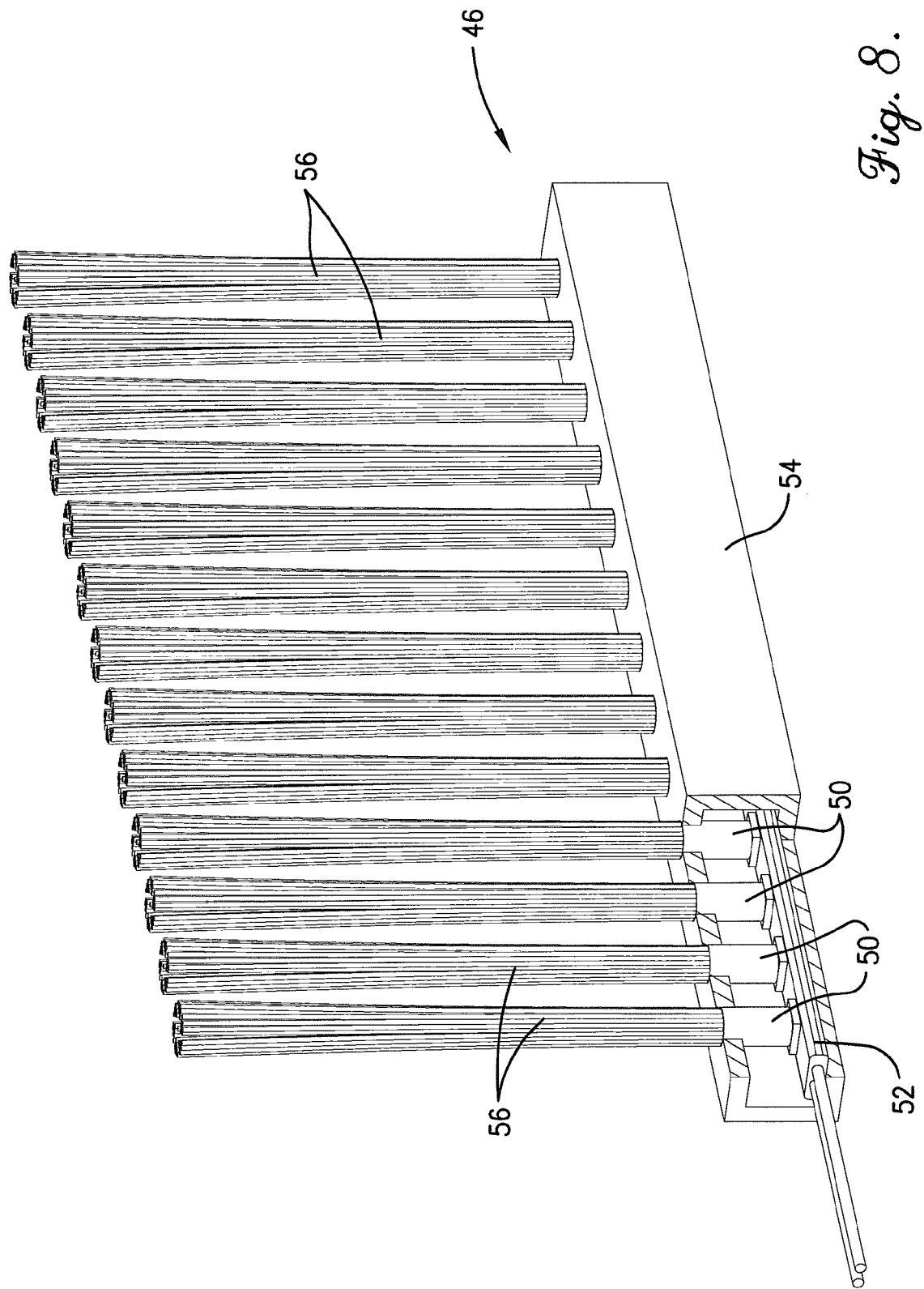

SYSTEM AND METHOD FOR ILLUMINATING A SPORTS FIELD

BACKGROUND

American football is one of the most popular sports in the world. The objective of the game is to score points by advancing the ball into the opposing team's end zone or kicking the ball through the opposing team's goal posts. The team with possession of the ball (offense) has four attempts or downs in which to advance the ball at least 10 yards towards the opponent's end zone. If the offense gains at least 10 yards, it gets a first down and starts a new set of four downs to gain another 10 yards and/or to score.

The distance the offense needs to gain for a first down is measured with first down measuring chains. These measuring chains include a 10 yard metal chain with poles attached to each end. Two individuals (the "chain gang") hold the poles along the sideline and then carry the poles and chain onto the playing field when a measurement is needed.

Players often run and/or are pushed out of bounds and collide with the first down measuring chains or the chain gang, occasionally resulting in injury to the players and/or the chain gang. The chains are also difficult to use and slow the pace of the game. Also, because the chains are positioned along the sideline during plays, they don't provide the players, coaches, or fans an obvious indication of the distance needed for a first down. Television networks often superimpose a computer-generated line of scrimmage and/or first down line on an image of the football field so that television viewers can more readily see how far the offense has to go for a first down, but these lines can only be seen by television viewers and are therefore no help to players, coaches, and fans at the game.

Accordingly, there is a need for an improved system and method for indicating and measuring first downs and other markers on football fields and other sports fields.

SUMMARY

The present invention solves the above-described problems and provides a distinct advance in the art of indicating and measuring systems and methods for football fields and other sports fields.

One embodiment of the invention is a system for illuminating a football field so as to indicate or emphasize certain markings and/or certain positions on the sports field. The system broadly comprises a plurality of light arrays and a control system for controlling the light arrays. The light arrays are configured to be positioned in a spaced-apart manner under a portion of the field's turf and oriented to emit light upwards through the turf. The control system selectively controls activation of the light arrays to provide illuminated indications of a current line of scrimmage, a first down marker, and/or other points of interest on the football field.

In one embodiment, each light array comprises a plurality of linearly-aligned light-emitting diodes (LEDs) or other lights interconnected by a power conductor. The light arrays may be of any length and may be positioned at any desired intervals on the field. Each light array may further comprise a plurality of light guides positioned adjacent each of the lights and extending upwardly through the turf to direct light from the lights through the turf. The light guides may be fiberoptic strands or clear synthetic grass strands approximately equal in length to strands of grass in the turf.

An embodiment of the control system comprises a main controller, a light controller, and a switch. The main controller, which in one embodiment is a scoreboard controller, is used to input data relating to a game as it is played. For example, an operator may input the current down, ball position, and remaining yardage for a first down into the main controller. This data may then be used to transmit instructions to a scoreboard and to the light controller. The light controller receives the data and/or instructions from the main controller and uses it to selectively control the light arrays. The light switch is electrically connected between the light controller, the light arrays, and a power source and is operable to selectively switch power to the light arrays under the direction of the light controller.

The control system may be used to selectively activate particular light arrays to illuminate and highlight specific portions of the football field. For example, when a team begins an offensive series, an operator of the control system may instruct it to activate the light arrays closest to the line of scrimmage and the first down marker. The activated light arrays direct light up through the turf to illuminate the portion of the turf corresponding to the line of scrimmage and first down markers. Then, as the offense moves the ball down the field, an operator of the control system may instruct it to illuminate the light arrays nearest the new line of scrimmage and new first down marker. This provides, fans, players, and coaches an easy to see and constantly updated indication of the current line of scrimmage and first down markers after every play.

The control system may also be operated to illuminate light arrays nearest the ball direction markers, end zone, and other areas on the field. The control system may also be programmed or operated to activate some or all of the light arrays in a blinking, periodic and/or wave fashion to indicate when points are scored, sacks are made, or other notable events occur.

The present invention offers numerous advantages over conventional methods of marking and measuring distances on sports fields. For example, because the light arrays of the present invention are positioned within the turf and direct light upward through the turf, they do not interfere with the players, coaches, and officials on or near the field. Moreover, light emitted from the light arrays can be easily seen by players, fans, and coaches and thus provide clear indications of important positions such as a line of scrimmage and/or first down marker. This allows players to more easily determine how many yards are needed for a first down and allows fans to more intuitively follow the progress of the game.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 8 is a partial fragmentary perspective view of a light array constructed in accordance with an embodiment of the invention.

Figure 1:
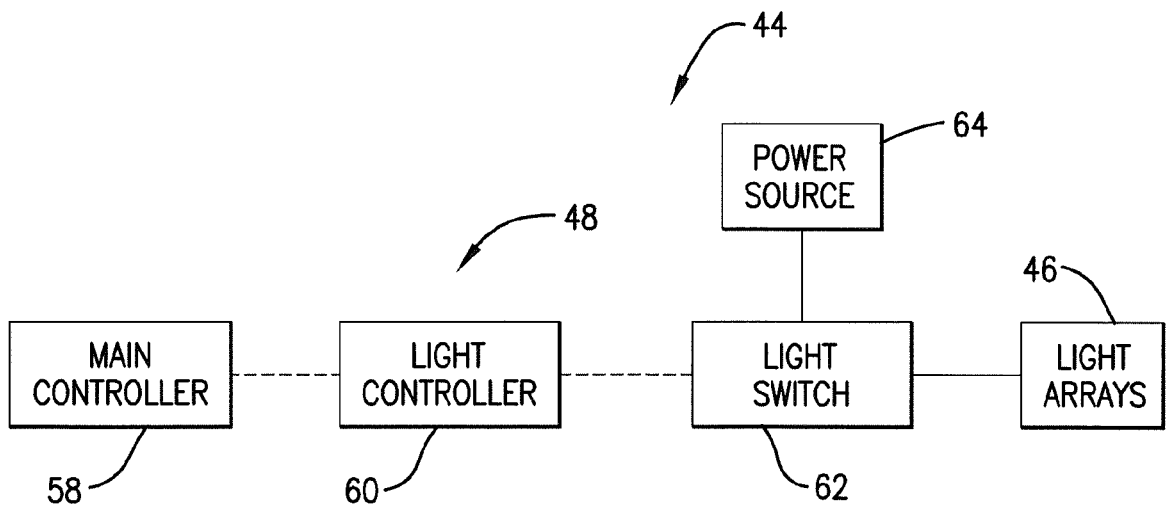
FIG. 1 is a block diagram of components of an illumination system constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The present invention is a system and method for illuminating a sports field so as to indicate or emphasize certain markings and/or positions on the sports field. The system may be used with any sports field such as a soccer field, baseball field, rugby field, etc., but is particularly suited for use with a football field. For example, as described in more detail below, the system may be used to illuminate and emphasize a line of scrimmage, a first down marker, and/or other points of interest on a football field.

Figure 3:
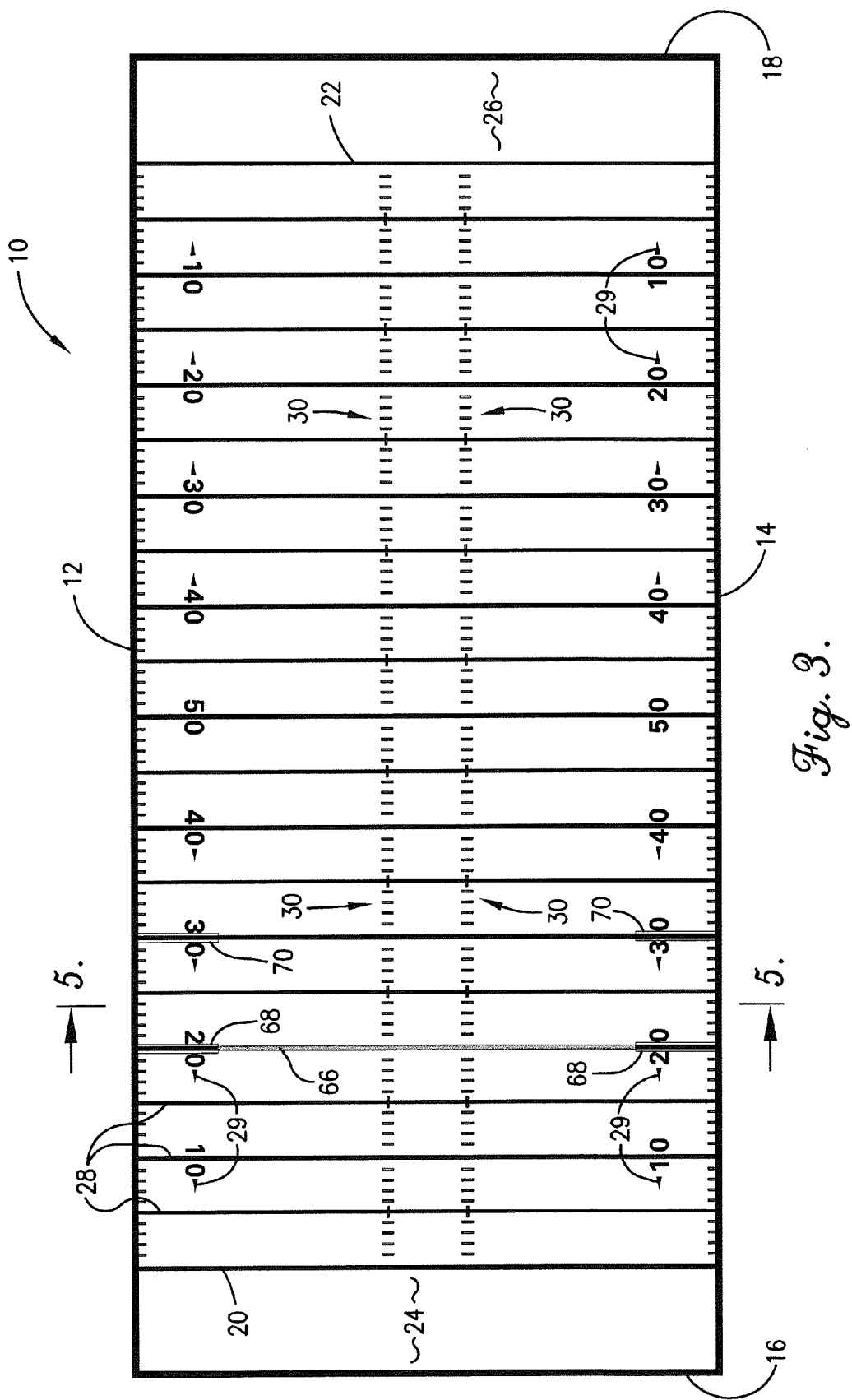
FIG. 3 is a schematic representation of a football field with selected portions illuminated with the system of the present invention.

FIG. 3 is a schematic representation of a typical American football field 10, which is 360 by 160 feet. The field 10 is bounded by sidelines 12, 14 and end lines 16, 18 which define in bounds and out of bounds areas. Near each end of the field are goal lines 20, 22 that are 100 yards apart. A scoring area called an end zone 24, 26 extends between each goal line 20, 22 to each end line 16, 18.

Yard lines 28 cross the field every 5 yards and are numbered every 5 or 10 yards from each goal line to the 50 yard line. Directional arrows 29 may be positioned near the yard line markers to show the direction to the closest end zone. Two rows of short lines 30, known as hash marks, run at 1 yard intervals perpendicular to the sidelines near the middle of the field.

The football field 10 may be covered with artificial turf or natural turf (grass). The illumination system of the present invention may be used with either. For example, the illumination system may be retrofitted into an existing turf that is already installed on a football field or integrated into a new turf and installed with the turf.

Figure 5:
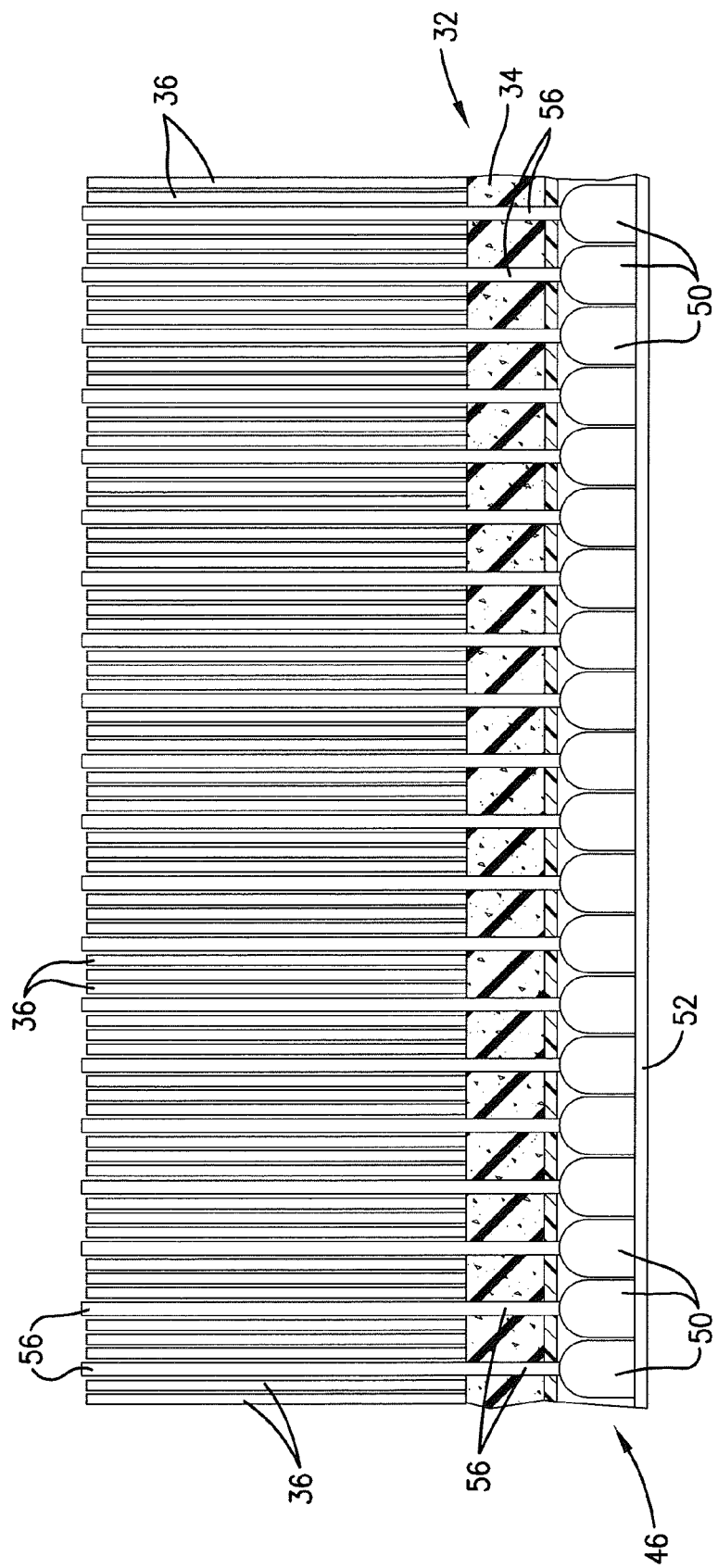
FIG. 5 is a vertical sectional view of a football field with synthetic turf showing an embodiment of the illumination system installed therein.
Figure 6:
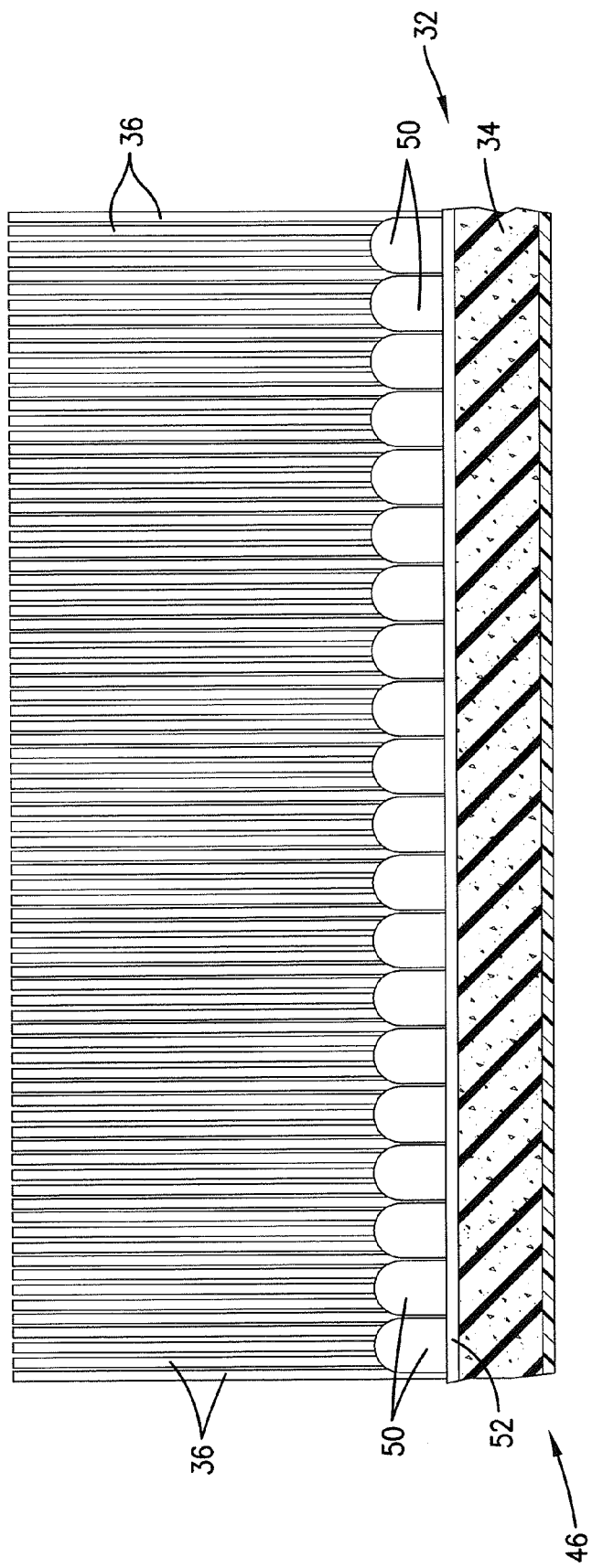
FIG. 6 is another vertical sectional view of a football field with synthetic turf showing another embodiment of the illumination system installed therein.

FIGS. 5 and 6 are vertical sectional views of an exemplary football field 10 with synthetic turf 32. The turf 32 broadly includes a backing layer 34 and a plurality of strands of synthetic grass 36 extending upwardly from the backing layer 34. The turf 32 may be placed over several other support and drainage layers not shown or described herein.

Figure 7:
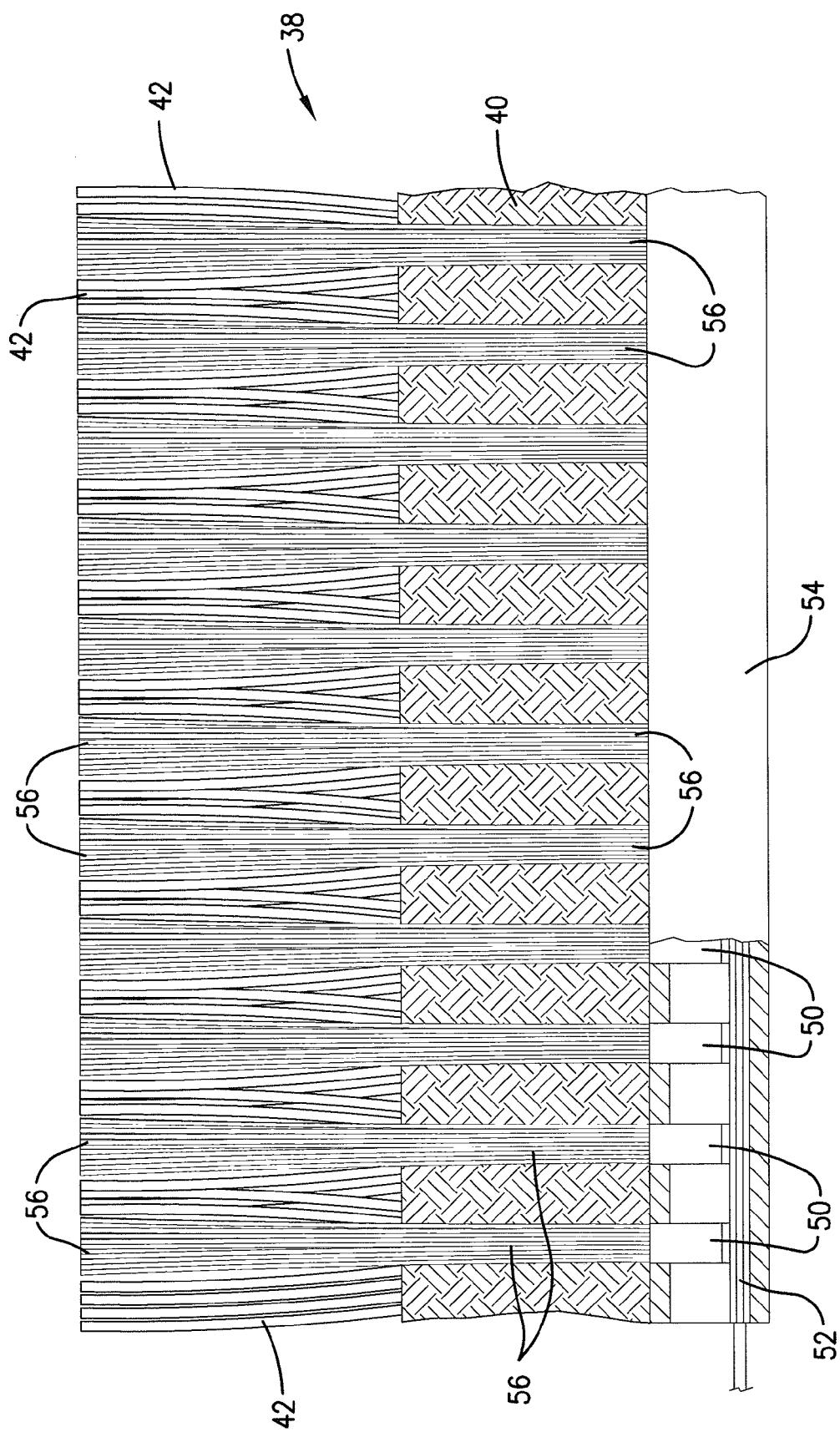
FIG. 7 is a vertical sectional view of a football field with natural turf showing an embodiment of the illumination system installed therein.

FIG. 7 is a vertical sectional view of an exemplary football field 10 with natural turf 38. The turf 38 broadly includes a base of soil 40 or other organic matter and grass 42 growing in the soil. As with the synthetic turf 32, the natural turf 38 may be placed over several other support and drainage layers.

Turning now to FIG. 1, a sports field illumination system 44 constructed in accordance with an embodiment of the invention is illustrated. The system 44 may be used to illuminate and emphasize selected portions of the above-described football field 10 or other sports field and broadly comprises a plurality of light arrays 46 and a control system 48 for controlling the light arrays. The light arrays 46 are configured to be positioned in a spaced-apart manner under a portion of the turf 32 or 38 and oriented to emit light upwards through the turf as described in more detail below. The control system 48 selectively controls activation of the light arrays 46 to provide illuminated indications on the field also as described in more detail below.

The light arrays 46 may include any light sources operable to direct light upwardly through the turf 32, 38 so as to illuminate portions of the turf. An exemplary light array 46 is shown in FIG. 8 and comprises a series of linearly-aligned and spaced-apart light-emitting diodes (LEDs) or other lights 50 connected by a flexible ribbon conductor or other power conductor 52. In one embodiment, the lights 50 are waterproof, ultra-high brightness, 6 watt, 24 volt, multi-color LEDs spaced approximately 1-2" apart along the length of the conductor 52.

In one embodiment, the lights 50 and power conductor 52 are positioned in a water-resistant raceway or track 54 to keep the lights aligned and to protect them from breakage. The raceway or track 54 has upper openings for directing light upwardly from the lights. In other embodiments, the lights 50 and power conductor 52 require no raceway or other protective enclosure.

Each light array 46 may further comprise a plurality of light guides 56 positioned adjacent each of the lights 50 and extending upwardly so as to direct light from the lights through the turf 32, 38. In one embodiment, the light guides 56 are fiberoptic strands approximately equal in length to strands of grass in the turf. The fiberoptic strands are preferably no greater than 0.75 mm in diameter so that they are flexible and feel similar to the strands of grass in the artificial turf. In other embodiments, the light guides 56 are clear strands of synthetic grass so that they have the exact same feel as the grass in the turf.

FIG. 5 shows an embodiment of a light array 46 installed in a section of turf 32. The LEDs or other light sources 50 are positioned in the lower part of the turf, such as on, in, or below the turf's backing layer 34. The lights 50 are not positioned in a raceway or track in this embodiment. The light guides 56 are attached to or near the LEDs and extend upwardly at least partially through the grass strands 36 of the turf. The light emitted from the lights 50 illuminates the light guides 56 to illuminate the portions of the turf over the light array 46.

FIG. 6 shows another embodiment of a light array 46 installed in a section of turf 32. In this embodiment, the LEDs or other light sources 50 are positioned between the backing layer 34 of the turf and the upper portions of the grass strands 36. Because the lights 50 are positioned nearer the top surface of the turf, light emitted from the lights 50 illuminate the upper surface of the turf 32 without light guides.

FIG. 7 shows an embodiment of a light array 46 installed in natural turf 38. The LEDs or other light sources 50 and the track or other raceway 54 in which they are mounted are buried below the turf. The light guides 56 are attached to or near the lights 50 and extend upwardly at least partially through the grass 42 of the turf.

The light arrays 46 may be of any length and may be positioned anywhere within the turf 32, 38. In one embodiment, the light arrays are approximately 1-50 feet in length and are positioned perpendicular to each of the sidelines 12, 14 so that they extend from each of the sidelines toward the hash marks 30. In another embodiment, the light arrays 46 are approximately 100 feet in length so that they extend across the entire width of the football field 10.

The light arrays 46 may be spaced any distance apart between the end zones 24, 26. In one embodiment, the light arrays 46 are positioned approximately 1" apart across the entire length of the field 10. This permits marking of lines of scrimmage and first downs with a high degree of accuracy. This amounts to 3,600 light arrays when they extend across the entire width of the field or two rows of 3,600 light arrays when they extend from each side line and only partially across the width of the field. The lights arrays 46 may also be spaced further apart when it is not economically practical to place them in every inch of the field.

Light arrays 46 may be positioned in other locations within the turf 32, 38 as well. For example, light arrays may be positioned under the hash marks 30 and in 1" intervals between the hash marks. Light arrays 46 may also be positioned under the directional arrows 29, in the end zones 24, 26, and under other portions of the turf.

The control system 48 selectively controls activation of the light arrays 46 to illuminate and emphasize selected areas or positions on the football field 10. An embodiment of the control system is illustrated in FIG. 1 and comprises a main controller 58, a light controller 60, and a switch 62. The main controller 58 is used to input data relating to a game as it is played. For example, an operator may input the current down, ball position, and remaining yardage for a first down into the main controller. This data may then be used to transmit instructions to the light controller 60.

The main controller 58 may be positioned anywhere in a sports stadium, such as in an elevated press box, and may be operated by an official or other authorized person. The main controller 58 may communicate with the lighting controller 60 over a wired or wireless data link. In an exemplary embodiment of the invention, the main controller 58 and light controller 60 communicate over an encrypted and redundant wireless RF data channel or channels.

In one embodiment, the main controller 58 is a scoreboard controller used to control a scoreboard. For example, the main controller 58 may be a Daktronics All Sport 1600, 5000, or 5500 series scoreboard controller.

The light controller 60 receives data and/or instructions from the main controller 58 and uses it to selectively control the light arrays 46. The light controller 60 may be any type of computer or controller and may implement an LED control software such as Led Editor 9.0 software available from XIXUN. The main controller 58 and/or the light controller 60 may also include a rheostat or other adjustment mechanism for adjusting an intensity of the light arrays 46.

The light switch 62 is electrically connected between the light controller 60, the light arrays 46, and a power source 64 and is operable to selectively switch power to the light arrays 46 under the direction of the light controller 60. The light switch 62 and light controller 60 may communicate over a wired or wireless data link.

The power source 64 may be any electrical supply or connection that delivers electricity to the light switch 62 and light arrays 46. In one embodiment, the light source 64 includes a 300 watt, 120 volts/12 volts LED dimmable transformer.

Figure 2:
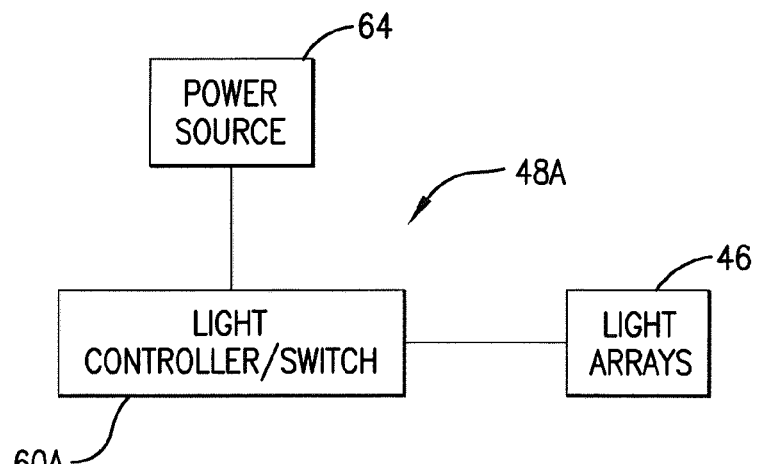
FIG. 2 is a block diagram of components of an illumination system constructed in accordance with another embodiment of the invention.

A control system 48A constructed in accordance with another embodiment of the invention is illustrated in FIG. 2. The control system 48A is similar to the control system 48 except that it comprises a light controller/switch 60A that combines some of the functions of the main controller 58, light controller 60, and light switch 62.

The present invention may also comprise one or more computer programs stored in or on computer-readable medium residing on or accessible by the main controller 58, light controller 60, or the combined light controller/switch 60A. Each computer program preferably comprises an ordered listing of executable instructions for implementing logical functions in the controllers. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 4:
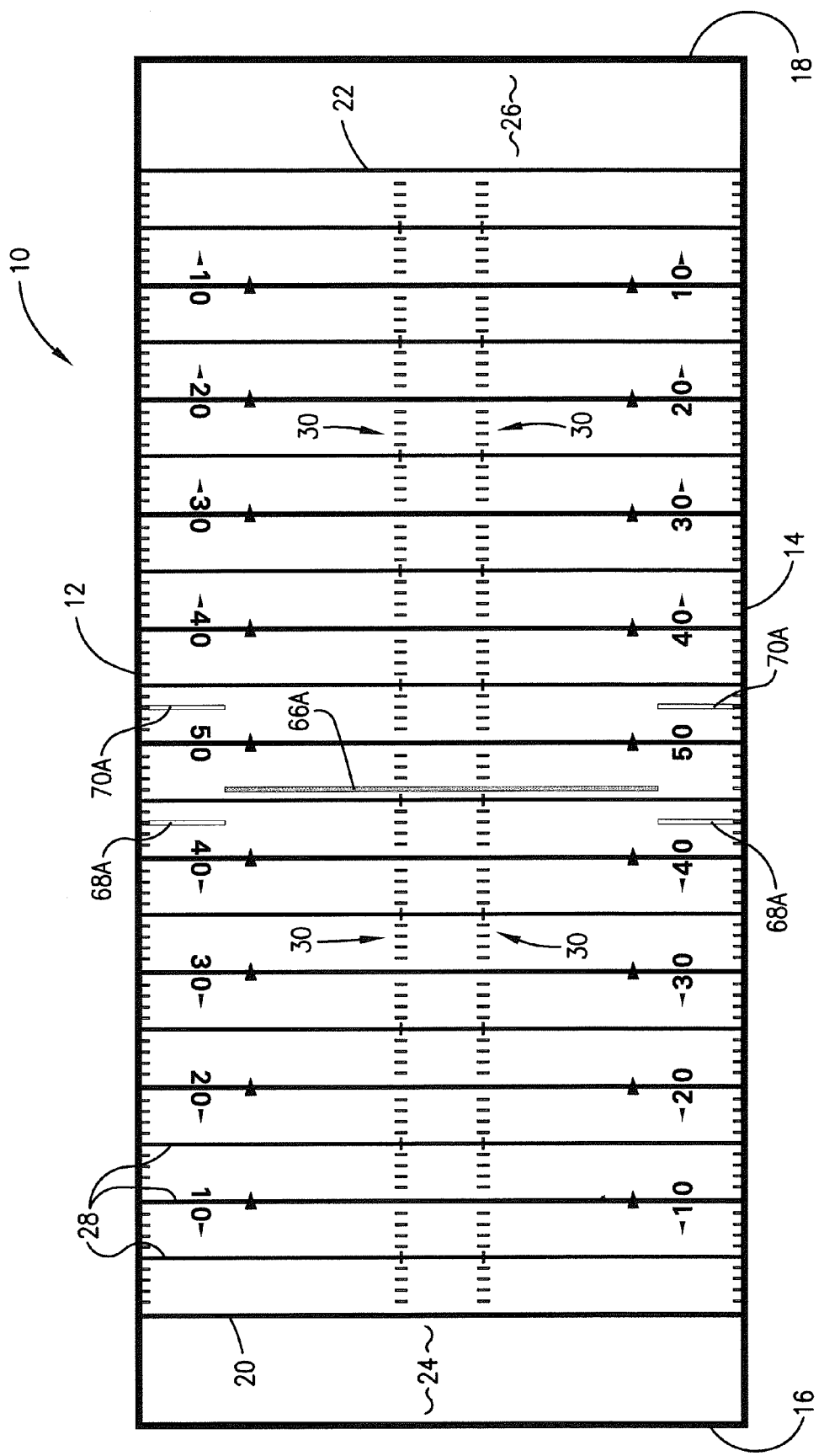
FIG. 4 is another schematic representation of a football field with other selected portions illuminated with the system of the present invention.

The above-described control systems 48, 48A may be used to selectively activate particular light arrays 46 to illuminate and highlight specific portions of the football field 10. For example, when a team begins an offensive series, the light arrays 46 closest to the line of scrimmage 66 and first down markers 68, 70 may be activated as shown in FIG. 3 to create visual and illuminated markers for the line of scrimmage and first down markers. Then, as the offense moves the ball down the field, the light arrays nearest the new line of scrimmage and first down markers may be activated. For example, FIG. 4 illustrates a line of scrimmage 66A and first down markers 68A, 70A for a set of downs that began on the 43 yard line and after the offense has gained 3 yards ($2^{nd}$ down and 7 yards to go).

The control system may also be operated to activate the light arrays nearest the ball direction markers, end zone, and other areas of the field. The control system may also be programmed or operated to operate some or all of the light arrays in a blinking or other periodic and/or wave fashion to indicate when points are scored, sacks are made, or other notable events occur.

The present invention offers numerous advantages over conventional methods of marking and measuring distances on sports fields. For example, because the light arrays of the present invention are positioned within the turf and direct light upward through the turf, they do not interfere with the players, coaches, and officials on or near the field. Moreover, light emitted from the light arrays can be easily seen by players, fans, and coaches and thus provide clear indications of important positions such as a line of scrimmage and/or first down marker. This allows players to more easily determine how many yards are needed for a first down and allows fans to more intuitively follow the progress of the game.

Although the invention has been described with reference to the preferred embodiment illustrated in the attached drawing figures, it is noted that equivalents may be employed and substitutions made herein without departing from the scope of the invention as recited in the claims. For example, the specific light arrays and control system described herein may be replaced with other light and control systems without departing from the scope of the invention.

Having thus described the preferred embodiment of the invention, what is claimed as new and desired to be protected by Letters Patent includes the following:

1. A system for illuminating a football field covered with turf, the system comprising:
    a plurality of spaced-apart light arrays configured to be positioned under a portion of the turf, each of the light arrays comprising:
        a plurality of LED lights interconnected by a power conductor; and
        a plurality of light guides positioned adjacent each of the lights and extending upwardly through the turf to direct light from the lights through the turf, wherein the light guides are fiber optic strands approximately equal in length to strands of grass in the turf; and
    a control system for selectively controlling activation of the light arrays to provide illuminated indication of a current line of scrimmage and first down marker on the football field, wherein the control system includes an adjustment mechanism for adjusting an intensity of the LEDs.

2. A system for illuminating a football field covered with turf, the system comprising:
    a plurality of spaced-apart light arrays configured to be positioned under a portion of the turf, each of the light arrays comprising:
        a plurality of LED lights interconnected by a power conductor; and
        a plurality of light guides positioned adjacent each of the lights and extending upwardly through the turf to direct light from the lights through the turf, wherein the light guides are fiber optic strands approximately equal in length to strands of grass in the turf; and
    a control system for selectively controlling activation of the light arrays to provide illuminated lines on the football field, wherein the control system allows a person to manually or remotely activate and deactivate individual light arrays so as to indicate a current line of scrimmage and a first down marker.

3. The system of claim 2, wherein the light arrays are attached to the turf and installed on the field with the turf.

4. The system of claim 2, wherein the intensity of the lights is adjustable.

5. A system for illuminating a football field covered with turf, the system comprising:
    a plurality of light arrays configured to be spaced approximately one inch apart along a length of a football field and configured to be positioned under a portion of the turf, wherein each light array comprises:
        a water-resistant raceway or track housing a plurality of lights interconnected by a power conductor;
        a plurality of light guides adjacent each of the lights, wherein each light guide penetrates the raceway or track and extends upwardly through the turf to direct light from the lights through the turf, wherein the portion of the light guide extending through the turf is a fiber optic strand approximately equal in length to strands of grass in the turf and no greater than 0.75 mm in diameter; and
    a control system for selectively controlling activation of the light arrays to provide illuminated lines on the football field, wherein the control system allows a person to manually or remotely activate and deactivate individual light arrays so as to indicate a current line of scrimmage and a first down marker.

6. The system of claim 5, wherein the light arrays are attached to the turf and installed on the field with the turf.

7. The system of claim 5, wherein the intensity of the lights is adjustable.

8. The system of claim 5, wherein the lights are LEDs.

* * * * *